United States Patent [19]

Sakamoto

[11] Patent Number: 4,840,987

[45] Date of Patent: Jun. 20, 1989

[54] FLAME RETARDANT HEAT-SHRINKABLE TUBE

[75] Inventor: Yoshito Sakamoto, Osaka, Japan

[73] Assignee: Sumitomo Electric Industries, Ltd., Japan

[21] Appl. No.: 169,692

[22] Filed: Mar. 18, 1988

[51] Int. Cl.$^4$ .................................................. C08K 3/22
[52] U.S. Cl. ...................................... 524/436; 428/35.1
[58] Field of Search ............................ 428/36; 524/436

[56] References Cited

U.S. PATENT DOCUMENTS

| | | | |
|---|---|---|---|
| 3,022,543 | 2/1962 | Baird et al. | 428/36 |
| 3,734,273 | 5/1973 | Watanabe | 428/36 |
| 3,922,442 | 11/1975 | North et al. | 524/437 |

*Primary Examiner*—Veronica P. Hoke
*Attorney, Agent, or Firm*—Sughrue, Mion, Zinn, Macpeak & Seas

[57] ABSTRACT

A flame retardant heat-shrinkable tube comprising a crosslinked flame retardant resin composition which comprises:

(a) 100 parts by weight of an ethylene/vinyl acetate copolymer having a vinyl acetate content of 20 wt % or more based on the total amount of the copolymer or 100 parts by weight of a resin mixture containing a polyolefin resin and an ethylene/vinyl acetate copolymer the resin mixture having a vinyl acetate content of 20 wt % or more based on the total amount of the resin mixture, and (b) from 150 to 250 parts by weight of magnesium hydroxide.

6 Claims, No Drawings

FLAME RETARDANT HEAT-SHRINKABLE TUBE

FIELD OF THE INVENTION

The present invention relates to a flame retardant heat-shrinkable tube having excellent flame retardancy without the generation of toxic gas and excellent mechanical properties.

BACKGROUND OF THE INVENTION

Recently, safety in electric cables has been highly desired, i.e., electric cables for atomic power plants, vehicles, various electronic devices, etc. have been desired to have excellent flame retardancy without the generation of toxic gas during combustion of the cables. In accordance with the above, heat-shrinkable tubes used for protection, insulation or the like of these electric cables have also been desired to have excellent flame retardancy without the generation of toxic gas during combustion of the tubes.

In order to attain the above requirements, methods for attaining flame retardancy of heat-shrinkable tubes have been proposed wherein a large amount of a metallic hydrate, such as aluminum hydroxide and magnesium hydroxide, is added to polyethylene or the like (as described in Japanese Patent Publication No. 41367/87); or the combination of metallic hydrate and red phosphorous or wherein the combination of magnesium hydroxide and carbon powder is utilized (as described in Japanese Patent Publication Nos. 13832/85 and 10898/82).

However, if an inorganic flame retardant such as metallic hydrate is added to a resin composition such as polyethylene in an amount capable of attaining excellent flame retardancy passing the Standard All-tubing Flame Test of Underwriters Laboratories (UL Standard), the mechanical properties of the resin composition, particularly the elongation, are deteriorated, such that the UL Standard (elongation of 200% or more) is not satisfied.

Moreover, in the methods using red phosphorous or carbon powder are not suitable for improving the flame retardancy of heat-shrinkable tubes which are required to be colored several different colors depending on their objective use, because the resin composition is colored red or black.

SUMMARY OF THE INVENTION

Accordingly, an object of the present invention is to provide a flame retardant heat-shrinkable tube having excellent flame retardancy without the generation of toxic gas and excellent mechanical properties.

Other objects of the present invention will be apparent from the following description.

The above objects of the present ivention have been attained by a flame retardant heat-shrinkable tube comprising a crosslinked flame retardant resin composition which comprises:

(a) 100 parts by weight of an ethylene/vinyl acetate copolymer having a vinyl acetate content of 20 wt % or more based on the total amount of the copolymer or 100 parts by weight of a resin mixture containing a polyolefin resin and an ethylene/vinyl acetate copolymer the resin mixture having a vinyl acetate content of 20 wt % or more based on the total amount of the resin mixture, and (b) from 150 to 250 parts by weight of magnesium hydroxide.

DETAILED DESCRIPTION OF THE INVENTION

The general procedure for attaining the heat-recovery property of a heat-shrinkable tube comprises heating an polyethylene tube which is previously crosslinked to its melting point or more, inflating to a desired extent, and cooling while maintaining the inflated shape so as to maintain the inflated shape after cooling by crystals thus formed. The heat-shrinkable tube obtained can return to its original shape by heating again to its melting point or more. Accordingly, the crystalline component and the crosslinking of the molecules are necessary in the materials having a heat-recovery property.

The ethylene/vinyl acetate copolymer used in the present ivention has a vinyl acetate content of 20 wt % or more, preferably from 20 to 40 wt %, based on the total amount of the copolymer. If the vinyl acetate content is less than 20 wt %, the amount of magnesium hydroxide required to pass the Standard All-tubing Flame Test is more than 250 parts by weight. As a result, an elongation of 200% or more cannot be obtained. If the vinyl acetate content is more than 40 wt %, it is not advantageous that the amount of the crystalline component becomes small and the shape maintaining property after cooling as a heat-shrinkable tube becomes not quite good.

Examples of the polyolefin resin used in combination with the ethylene/vinyl acetate copolymer having a vinyl acetate content of 20 wt % or more in the present invention include a polyethylene resin, an ethylene/vinyl acetate copolymer resin having a vinyl acetate content of less than 20 wt %, an ethylene/ethyl acrylate copolymer resin, an ethylene/butene-1 copolymer resin, combinations thereof, etc.

The resin composition used in the present ivention is formed by mixing one or more of polyolefin resin and an ethylene/vinyl acetate copolymer having a vinyl acetate content of 20 wt % or more so that the total vinyl acetate content of the resin composition is 20 wt % or more. If the vinyl acetate content of the resin composition is less than 20 wt %, the amount of magnesium hydroxide required to pass the Standard All-tubing Flame Test becomes more than 250 parts by weight so that the elongation of 200% or more cannot attained.

The amount of magnesium hydroxide added to the resin composition of the present invention is from 150 to 250 parts by weight per 100 parts by weight of the resin composition. If the amount is less than 150 parts by weight, a flame retardancy passing the Standard All-tubing Flame Test cannot attained. If the amount is more than 250 parts by weight, the elongation of 200% or more cannot be attained. The average particle diameter of the magnesium hydoxide is preferably from 0.2 to 20 μm, more preferably from 0.5 to 10 μm. The surface of the magnesium hydroxide is preferably treated with, e.g,. a suface active agent, a silane coupling agent, a titanate coupling agent, etc. in view of dispersing such into the resin composition (as described in Japanese Patent Publication No. 30262/75, Japanese Patent Application (OPI) No. 243155/85, U.S. Pat. No. 4,322,575, etc.) (the term "OPI" used herein means a published unexamined Japanese patent application).

The method for crosslinking which can be used in the present invention is not limited, and examples thereof include crosslinking by an organic peroxide compound (as described in Japanese patent Application (OPI) No. 34036/86), crosslinking (as described in Japanese Patent Publication No. 19459/76), or the like.

In the flame retardant heat-shrinkable tube of the present invention, an antioxidizing agent, a pigment, a lubricating agent, inorganic or organic fillers, or the like may be used.

The All-tubing Flame Test is carried out by: inserting a conductive material, having an outer diameter the same as the inner diameter of the heat-shrinkable tube, into the heat-shrinkable tube; and heating the tube with a burner. The tube is disqualified if the tube burns for 1 minute or more after putting out the burner; if the predetermined mark (i.e., the indicator flag defined in Standard All-tubing Test) of the tube burns out; or if cotton placed beneath the tube burns as a result of a matter dropped from the tube.

The present invention is explained in more detail referring to the following Examples and Comparative Examples which do not limit the present invention.

EXAMPLES 1 TO 8

The ingredients indicated in Table 1 below were mixed in the proportion indicated in Table 1 and formed into pellets. The pellets were formed into a tube having an outer diameter of 4.0 mm and an inner diameter of 2.8 mm by using an extruder so as to prepare samples of Examples 1 to 8. The tubes obtained each was irradiated by an electron beam of 24 Mrad so as to crosslink the tube.

The tensile test and the Standard All-tubing Flame Test, according to the UL Standard, were carried out on the tubes thus-obtained. The results obtained are shown in Table 1 below.

TABLE 1

| Ingredient | 1 | 2 | 3 | 4 | 5 | 6 | 7 | 8 |
|---|---|---|---|---|---|---|---|---|
| Ethylene/vinyl acetate copolymer 1 [1] | — | — | — | 60 | 60 | 60 | 60 | 60 |
| Ethylene/vinyl acetate copolymer 2 [2] | 100 | 100 | 100 | — | — | — | — | — |
| Ethylene/vinyl acetate copolymer 3 [3] | — | — | — | 40 | — | — | — | — |
| Straight chain low density polyethylene [4] | — | — | — | — | 40 | — | — | — |
| Ultra-low density polyethylene [5] | — | — | — | — | — | 40 | — | — |
| Ethylene/butene-1 copolymer [6] | — | — | — | — | — | — | 40 | — |
| Ethylene/ethyl acrylate copolymer [7] | — | — | — | — | — | — | — | 40 |
| Magnesium hydroxide [8] | 200 | 170 | 240 | 200 | 200 | 200 | 200 | 200 |
| Elongation (%) | 400 | 480 | 330 | 390 | 420 | 450 | 330 | 300 |
| All-tubing Flame Test | passed | passed | passed | passed | passed | passed | passed | passed |

Note:
(1) Ethylene/vinyl acetate copolymer 1:
Vinyl acetate content: 40 wt %
Melt index: 2 g/10 min
(2) Ethylene/vinyl acetate copolymer 2:
Vinyl acetate content: 27 wt %
Melt index: 1 g/10 min
(3) Ethylene/vinyl acetate copolymer 3:
Vinyl acetate content: 15 wt %
Melt index: 0.5 g/10 min
(4) Straight chane low density polyethylene:
Density: 0.992
Melt index: 2.5 g/10 min
(5) Ulutra-low density polyethylene:
Density: 0.900
Melt index: 0.4 g/10 min
(6) Ethylene/butene-1 copolymer:
Density: 0.88
Melt index: 4.0 g/10 min
(7) Ethylene/ethyl acrylate copolymer:
Ethyl acrylate content: 15 wt %
Melt index: 0.5 g/10 min
(8) Average diameter: 0.6-0.8 μm As shown in Table 1, all of the samples of Examples 1 to 8 according to the present invention have an elongation of 2005 or more and pass the Standard All-Tubing Flame Test.

COMPARATIVE EXAMPLES 1 TO 7

By using the ingredients indicated in Table 2 below, the same procedures as in Examples 1 to 8 were repeated so as to prepare samples of Comparative Examples 1 to 7.

The tensile test and the Standard All-tubing Flame Test according to the UL Standard were carried out on the tubes thus-obtained. The results obtained are shown in Table 2 below.

TABLE 2

| Ingredient | 1 | 2 | 3 | 4 | 5 | 6 | 7 |
|---|---|---|---|---|---|---|---|
| Ethylene/vinyl acetate copolymer 1 | — | — | — | 30 | 30 | — | — |
| Ethylene/vinyl acetate copolymer 2 | 100 | 100 | — | — | — | 100 | 100 |
| Ethylene/vinyl acetate | — | — | 100 | — | — | — | — |

TABLE 2-continued

| Ingredient | Comparative Example | | | | | | |
|---|---|---|---|---|---|---|---|
| | 1 | 2 | 3 | 4 | 5 | 6 | 7 |
| copolymer 3 | | | | | | | |
| Straight chain low density polyethylene | — | — | — | 70 | 70 | — | — |
| Magnesium hydroxide | 120 | 300 | 200 | 200 | 300 | — | — |
| Aluminum hydroxide (9) | — | — | — | — | — | 200 | 300 |
| Elongation (%) | 520 | 80 | 50 | 410 | 110 | 350 | 70 |
| All-tubing Flame Test | failure | passed | failure | failure | passed | failure | passed |

Note:
The ethylene/vinyl acetate copolymers 1 to 3, the straight chain low density polyethylene, and the magnesium hydroxide are the same as those used in Examples 1 to 8.
(9) Average particle diameter: 0.6–1.2 μ

As shown in Table 2, the samples of Comparative Examples 1 to 7, which are the outside of the scope of the present invention, cannot simultaneously attain an elongation of 200% or more and pass the Standard All-tubing Flame Test.

As stated in the foregoing, the flame retardant heat-shrinkable tube according to the present invention has both excellent flame retardancy without the generation of toxic gas and an excellent mechanical properties.

While the invention has been described in detail and with reference to specific examples thereof, it will be apparent to one skilled in the art that various changes and modifications can be made therein without departing from the spirit and scope thereof.

What is claimed is:

1. A flame retardant heat-shrinkable tube comprising a crosslinked flame retardant resin composition which consisting essentially of:
   (a) 100 parts by weight of an ethylene/vinyl acetate copolymer having a vinyl acetate content of 20 wt % or more based on the total amount of the copolymer or 100 parts by weight of a resin mixture containing a polyolefin resin and an ethylene/vinyl acetate copolymer said resin mixture having a vinyl acetate content of 20 to 40 wt % based on the total amount of said resin mixture, and
   (b) from 150 to 250 parts by weight of magnesium hydroxide.

2. A flame retardant heat-shrinkable tube as claimed in claim 1, wherein said polyolefin resin is selected from the group consisting of a polyethylene resin, an ethylene/vinyl acetate copolymer resin, an ethylene/ethyl acrylate copolymer resin, an ethylene/butene-1 copolymer resin, and a combination thereof.

3. A flame retardant heat-shrinkable tube as claimed in claim 1, wherein said magnesium hydroxide has an average particle diameter of from 0.2 to 20 μm.

4. A flame retardant heat-shrinkable tube as claimed in claim 3, wherein said magnesium hydroxide has an average particle diameter of from 0.5 to 10 μm.

5. A flame retardant heat-shrinkable tube as claimed in claim 1, wherein said magnesium hydroxide has been treated with a surface active agent or a titanate coupling agent.

6. A flame retardant heat-shrinkable tube as claimed in claim 1, wherein said crosslinking is carried out using an organic peroxide compound, an electron beam, or silane graft water crosslinking.

* * * * *